United States Patent Office 3,195,574
Patented July 20, 1965

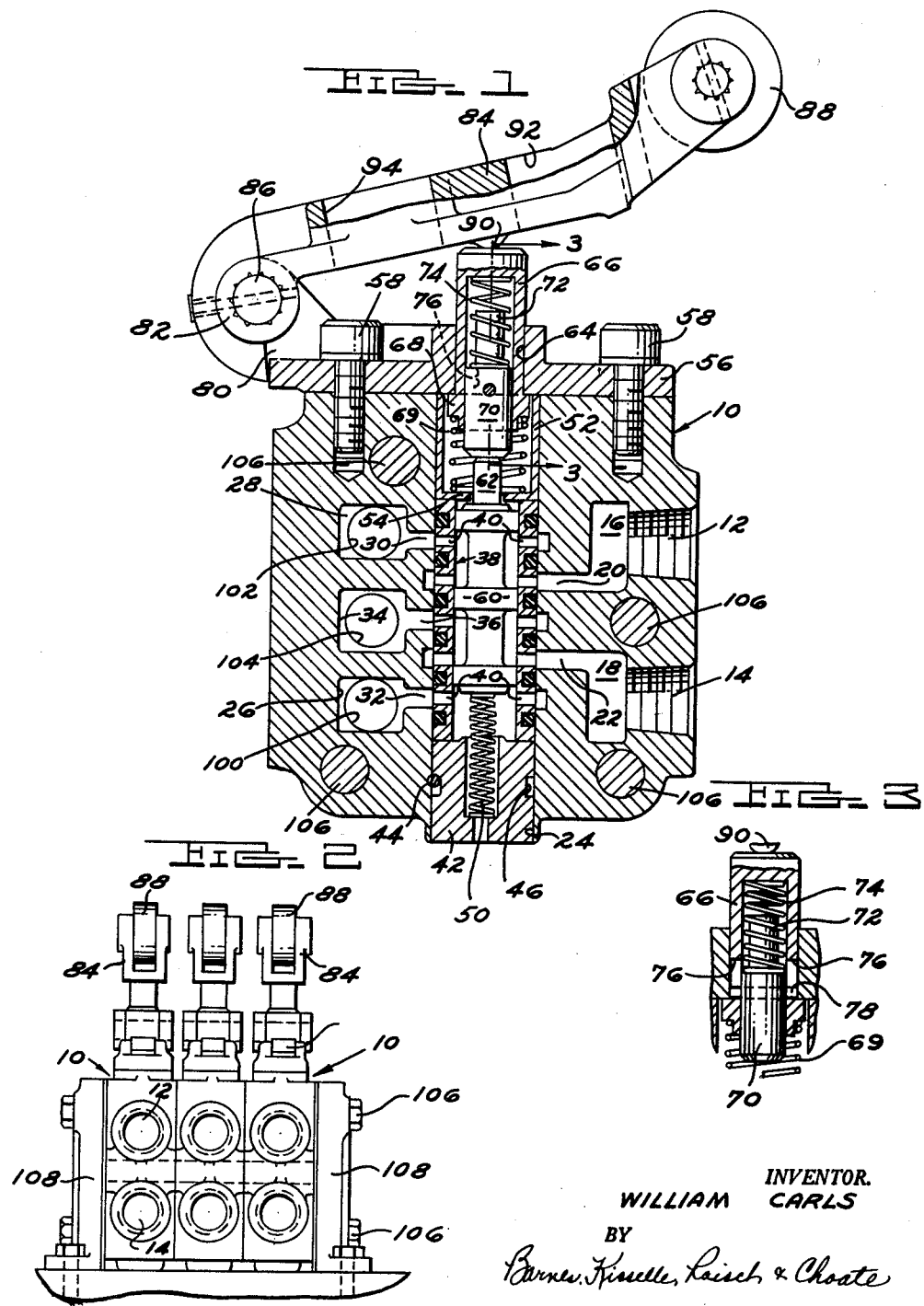

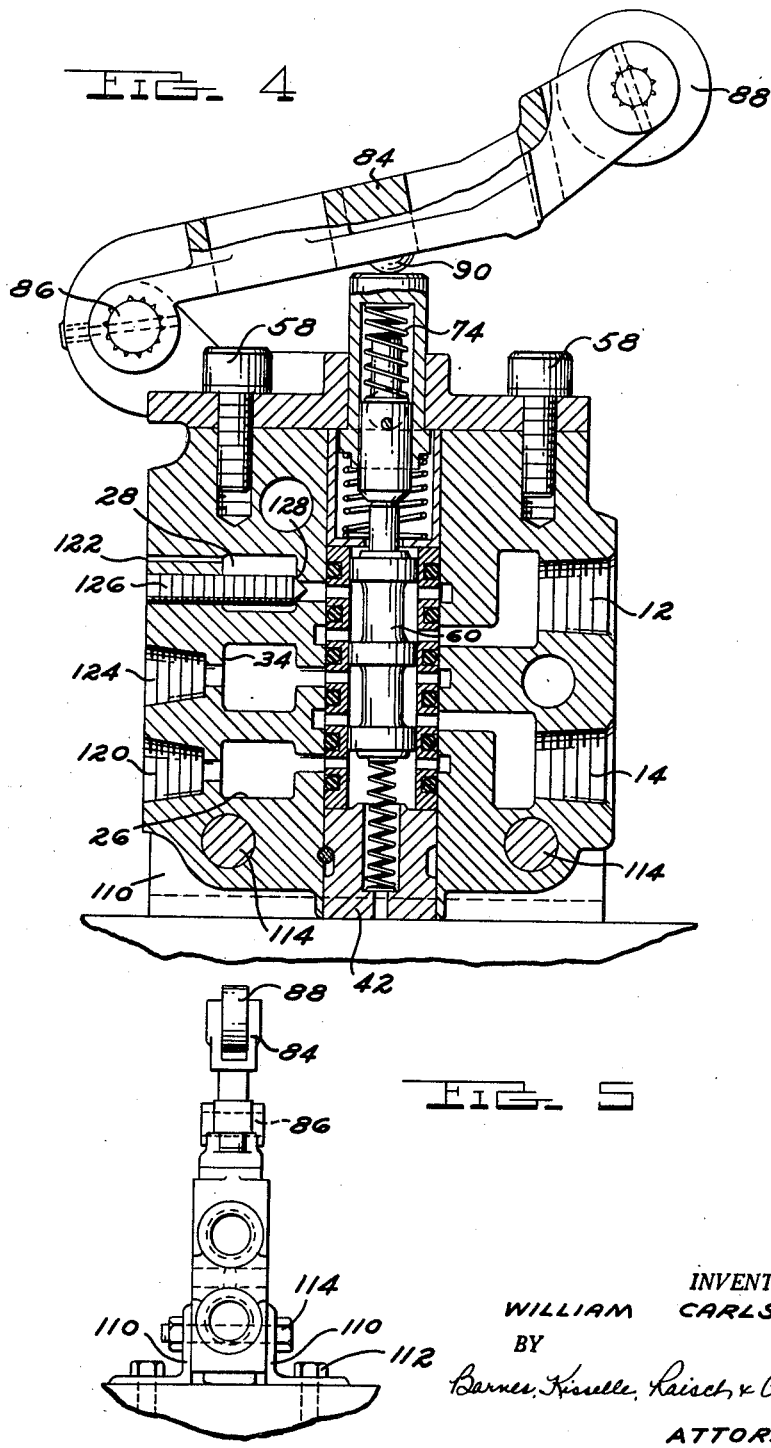

3,195,574
LEVER OPERATED VALVE ASSEMBLY WITH LOST MOTION CONNECTION
William Carls, Highland, Mich.
Filed Aug. 25, 1961, Ser. No. 133,852
5 Claims. (Cl. 137—625.69)

This invention relates to a valve assembly and more particularly to that type of valve which can be used either as an individual control valve independently mounted or as a valve which is stacked in a bank of valves with manifolding passages.

It is an object of the present invention to provide a versatile valve housing which can be used with mechanical controls without danger of damage to the valve due to undue pressure and yet with a quick response to the actuating motion.

Another object of the invention is the construction of a valve which is readily mounted in bank of valves and yet which can be individually serviced when required without dismantling the entire bank.

Another object of the invention is the construction of a valve housing which can be rendered more versatile by the use of optional pressure supply openings or exhaust metering openings.

A further object is the valve housing design which permits use either as an independent valve or as a bank valve.

Another specific object is the arrangement of an over-travel relationship between the valve actuated part and the valve itself, thus allowing for positive actuation without danger of mechanical fracture of the parts due to variations in cam mounting or contour.

Other objects and features of the invention relating to details of construction and operation are apparent in the following description and claims.

Drawing accompany the disclosure and the various views thereof may be briefly described as:

FIGURE 1, a vertical section through the valve showing the relationship of the parts.

FIGURE 2, a view of the valve as mounted in a bank of valves.

FIGURE 3, a sectional view on line 3—3 of FIGURE 1.

FIGURE 4, a sectional view similar to FIGURE 1 showing modified passages.

FIGURE 5, an end elevation of the valve shown in a single mounting.

Referring to the drawings:

In FIGURE 1 it will be seen that the valve housing 10 is a rectangular block having a relatively narrow horizontal width in one direction. On one of the narrow sides of the block is found a cylinder opening 12 and a cylinder opening 14 vertically spaced. Each cylinder opening connects respectively to L-shaped ports 16 and 18 each of which has a leg 20 and 22 which passes inwardly around a central bore 24 extending from top to bottom of the valve housing.

Exhaust ports 26 and 28 each have inwardly extending legs 30 and 32 which intersect the central bore. These legs are spaced outside the two legs 20 and 22. Centrally of these intersecting port legs is the pressure port 34 which has a bore intersecting leg 36. Within the bore 24 is a sleeve 38 having six external annular grooves containing O rings which seal on either side of the port passages 20, 22, 30, 32 and 36. The sleeve 38 also has transverse ports 40 which connect the outside of it between the various sets of O rings to the interior bore of the sleeve.

The sleeve 38 is positioned in the bore 24 by a bottom plug 42 which is held in by a transverse pin 44 intersecting an annular outside groove 46. The plug has an inner central recess for serving as a spring seat for a spring 50.

This permits a long spring to be used. At the upper end of the bore 24 is a sleeve 52 having a flanged end 54 with a central aperture.

This sleeve butts against the upper end of the sleeve 38 and is held in place by a top plate 56 secured by bolts 58. A three-land spool 60 slides in the sleeve 38 between the plug 42 and the sleeves 52. The spool has a stud 62 which passes through the opening in the flange 28. The spring 50 recessed in plug 42 bears against the lower end of the spool 60 to serve as a return spring.

The actuating mechanism for the device is located at the top, the top plate 56 having an opening 64 in which slides a thimble 66 which has a retaining flange 68 under the plate. A spring 69 seats against the flange 54 at the bottom and against the flange 68 at the top to serve as a return for the thimble 66.

The thimble 66 has within it a slide plug or push pin 70, one end of which bears against the stud 62 on the spool 60. The other end of the plug has a spring retainer projection 72 and is biased downwardly by a spring 74 bearing against the top of the recess in the thimble 66. The thimble 66 has diametrically opposed holes 76 and a cross-pin 78 transfixing the plug 70 has its ends riding in these holes 76 within the opening 64 in the plate 56.

At one end of the plate 56 is a pivot mounting flange 80 on which is mounted the bifurcate ends 82 of a lever 84 pivoted on a pin 86. The lever has a roller 88 at the upper end for receiving a cam pressure and intermediate the ends is a small protuberance 90 which rides on the top of the thimble 66 as a bearing point for the lever. The lever 84 has openings 92 and 94 which permit access to the bolts 58 so that the plate 56 can be readily removed without removal of the lever from the plate.

It will be seen that each port 26, 28 and 34 can have a connection to the side walls of each valve through transverse openings 100, 102 and 104 respectively. The valve also has transverse openings for retaining bolts 106 which hold the valves stacked together as shown in FIGURE 2. The end of the valve bank can be closed by end plates 108 held in place by the bolts 106.

In the operation of the embodiment shown in FIGURE 1, it will be seen that as the parts are positioned in the drawings, the cylinder port 12 is connected to the exhaust port 28 and the cylinder port 14 is connected to the pressure port 34. A shifting of the valve spool 60 downwardly will reverse this relationship so that the cylinder port 12 is connected to pressure and cylinder port 14 is connected to the exhaust port 26.

It will be seen that the shifting pressure through the came wheel 88 moves the thimble 66 downwardly, and through the spring 74, puts pressure on the plug 70 which in turn moves the stud 62 and the spool 60 against the spring 50. Thus, the pressure from the actuating lever is primarily transmitted through the spring 74 and upon seating of the valve spool 60 on the plug 42, there would still be considerable lost motion permissible by reason of the movement of the cross pin 78 in the opening 76. Upon return the spring 50 will shift the spool 60 upwardly and the spring 69 will shift the thimble 66 upwardly. Means to mechanically interengage the thimble 66 and the push pin or plug 70 at the extremities of the relative axial motion include the cross pin 78 acting within the opening 76.

In FIGURE 4, a modified type of valve housing is shown with no manifold openings extending through it. This valve is mounted by suitable brackets 110 held in place by bolts 112 and cross bolts 114. Instead of the manifold passages, the port 26 has a tapped opening 120. The port 28 has a small plate opening 122 and the pressure port 34 has a tapped opening 124. At the port 28 a needle valve 126 is screwed into the port seating at 128 to allow a metering of exhaust with individual settings for each particular valve. With these slight modifications the bank valve housing can become an individual control valve with an individual exhaust control for either cylinder port or both as desired.

I claim:

1. In a cam controlled valve of the type having a housing with a valve bore and fluid passageways intercepting said bore, a valve and control assembly for said housing comprising an apertured valve sleeve in said bore, a plug in said bore at one end of said sleeve to serve as a retainer, a hollow sleeve retainer at the other end of said valve sleeve in said bore having a flange to serve as a spring seat, an actuator thimble movable into said sleeve retainer and projecting from said valve housing, spring means interposed between said hollow sleeve flange and said thimble, a valve spool in said valve sleeve to control flow through said passageways in said housing, a spring between said plug and one end of said valve spool, a push pin slidable within said thimble engaging the other end of said valve spool, resilient means interposed between said thimble and said push pin to transmit motion one to the other, and means to mechanically interengage said thimble and said push pin at the extremities of a relative axial motion therebetween, wherein continued motion of said actuator thimble into said sleeve retainer will effect a direct and positive motion of said push pin.

2. In a valve control assembly as defined in claim 1, an axial projection on said valve spool extending through the flange of said hollow sleeve to contact said push pin.

3. In a valve control assembly as defined in claim 1, a top plate for said valve housing to retain said hollow sleeve and said actuator thimble in said housing, screw means accessible at the top of said plate to retain said top plate on the housing, a lever overlying said plate pivoted at one end to said plate at a point spaced from said thimble, means on said lever to contact said thimble, said lever having openings above said screw means to permit access thereto through said lever.

4. In a cam controlled valve of the type having a housing with a valve bore and fluid passageways intercepting said bore, a valve and control assembly for said housing comprising an apertured valve sleeve in said bore, a plug in said bore at one end of said sleeve to serve as a retainer, having a relatively deep spring seat recess, a hollow sleeve retainer at the other end of said valve sleeve in said bore having a flange to serve as a spring seat, an actuator thimble movable into said sleeve retainer and projecting from said valve housing, spring means interposed between said hollow sleeve flange and said thimble, a valve spool in said valve sleeve, a spring between said plug and one end of said valve spool, having one end in said spring seat recess, a push pin slidable within said thimble engaging the other end of said valve spool, resilient means interposed between said thimble and said push pin, to transmit motion one to the other, and means to mechanically interengage said thimble and said push pin at the extremities of a relative axial motion therebetween, wherein continued motion of said actuator thimble into said sleeve retainer will effect a direct and positive motion of said push pin.

5. In a cam controlled valve of the type having a housing with a valve bore and fluid passageways intercepting said bore, a cover plate on said housing overlying said bore, a valve and control assembly for said housing comprising an apertured valve sleeve in said bore having a dimension shorter than said bore and positioned to leave an axial space at one end of said sleeve, a plug in said bore at the other end of said sleeve to serve as a retainer at said other end, a hollow sleeve retainer at the said one end of said valve sleeve in said bore occupying the axial space between said one end of said valve sleeve and said cover plate, an actuator thimble movable into said sleeve retainer and projecting from said valve housing through said cover plate and retained in position by said cover plate, resilient means exerting an outward force on said actuator thimble, a valve spool in said valve sleeve to control flow through said passageways in said housing, resilient means interposed between said plug and one end of said valve spool, a push pin slidable within said thimble engaging the other end of said valve spool, resilient means interposed between said thimble and said push pin to transmit motion one to the other, and means to mechanically interengage said thimble and said push pin at the extremities of a relative axial motion therebetween, wherein continued motion of said actuator thimble into said sleeve retainer will effect a direct and positive motion of said push pin.

References Cited by the Examiner

UNITED STATES PATENTS

| | | | |
|---|---|---|---|
| 2,157,707 | 5/39 | Keel | 137—620 |
| 2,486,087 | 10/49 | Wright | 121—46.5 XR |
| 2,626,160 | 1/53 | Brumbaugh | 137—614.17 |
| 2,765,808 | 10/56 | Tydeman | 137—622 |
| 2,804,883 | 9/57 | Curlett | 137—622 |
| 2,894,492 | 7/59 | Ziskal | 121—46.5 XR |
| 3,040,778 | 6/62 | MacGregor | 137—630.15 |

FOREIGN PATENTS 846,403  1960  Great Britain.

ISADOR WEIL, *Primary Examiner.*

WILLIAM F. O'DEA, *Examiner.*